(12) United States Patent
Wilson et al.

(10) Patent No.: US 10,223,588 B2
(45) Date of Patent: *Mar. 5, 2019

(54) IMAGE FILTER BASED ON ROW IDENTIFICATION

(71) Applicant: Raven Industries, Inc., Sioux Falls, SD (US)

(72) Inventors: Edwin Ernest Wilson, Round Rock, TX (US); Robert Leonard Nelson, Jr., Austin, TX (US); David Anthony Fowler, Austin, TX (US)

(73) Assignee: Raven Industries, Inc., Sioux Falls, SD (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/437,331

(22) Filed: Feb. 20, 2017

(65) Prior Publication Data

US 2017/0228595 A1 Aug. 10, 2017

Related U.S. Application Data

(63) Continuation of application No. 14/706,831, filed on May 7, 2015, now Pat. No. 9,576,215.

(Continued)

(51) Int. Cl.
*G06K 9/00* (2006.01)
*A01D 34/00* (2006.01)
(Continued)

(52) U.S. Cl.
CPC ....... *G06K 9/00657* (2013.01); *A01D 34/008* (2013.01); *G06K 9/00671* (2013.01); *G06K 9/00697* (2013.01); *G06K 9/00791* (2013.01); *G06K 9/4604* (2013.01); *G06K 9/4633* (2013.01); *G06T 7/0002* (2013.01);
(Continued)

(58) Field of Classification Search
CPC .......... G06K 9/4633; G06K 2209/17
See application file for complete search history.

(56) References Cited

U.S. PATENT DOCUMENTS 6,686,951 B1 * 2/2004 Dickson ............... A01B 69/008
348/120
8,150,574 B2 4/2012 Han et al.
(Continued)

FOREIGN PATENT DOCUMENTS

WO WO-2013134480 A1 9/2013
WO WO-2015171946 A1 11/2015

OTHER PUBLICATIONS

Ji et al (NPL: "Crop-row detection algorithm based on Random Hough Transformation" Mathematical and Computer Modelling, 2011, pp. 5).*

(Continued)

*Primary Examiner* — Oneal R Mistry
(74) *Attorney, Agent, or Firm* — Schwegman Lundberg & Woessner, P.A.

(57) ABSTRACT

System and techniques for an image filter based on row identification are described herein. A crop row center represented in an image of a crop row can be calculated. A filter corresponding to a set of expected crop characteristics of the crop row can be obtained. Elements in the image can then be categorized based on applying the filter to the image when the filter anchored on the crop row.

33 Claims, 6 Drawing Sheets

Related U.S. Application Data

(60) Provisional application No. 61/991,260, filed on May 9, 2014.

(51) Int. Cl.
  *G06K 9/46* (2006.01)
  *G06T 7/00* (2017.01)
  *G06T 7/536* (2017.01)
  *A01B 69/00* (2006.01)

(52) U.S. Cl.
  CPC ............ *G06T 7/536* (2017.01); *A01B 69/007* (2013.01); *G06K 2207/1016* (2013.01); *G06K 2209/17* (2013.01); *G06T 2207/10016* (2013.01); *G06T 2207/10021* (2013.01); *G06T 2207/10024* (2013.01); *G06T 2207/10028* (2013.01); *G06T 2207/20076* (2013.01); *G06T 2207/20092* (2013.01); *G06T 2207/30244* (2013.01)

(56) References Cited

U.S. PATENT DOCUMENTS

| | | | |
|---|---|---|---|
| 9,576,215 B2 | 2/2017 | Wilson et al. | |
| 2007/0003107 A1* | 1/2007 | Wei | A01B 69/008 382/104 |
| 2008/0065287 A1* | 3/2008 | Han | A01B 69/007 701/28 |
| 2012/0195496 A1 | 8/2012 | Zaman et al. | |
| 2013/0235183 A1* | 9/2013 | Redden | G06K 9/2036 348/89 |
| 2015/0324648 A1 | 11/2015 | Wilson et al. | |
| 2017/0188564 A1* | 7/2017 | Stowe | A01M 21/046 |
| 2017/0219711 A1* | 8/2017 | Redden | G01N 33/0098 |

OTHER PUBLICATIONS

Gee et al (NPL: "Imaging & Signal Processing Detecting crops and weeds in precision agriculture", Sep. 9, 2008, SPIE Newsroom. DOI: 10.1117/2.1200809.1226, pp. 6).*

"U.S. Appl. No. 14/706,831, Corrected Notice of Allowance dated Jan. 30, 2017", 2 pgs.

"U.S. Appl. No. 14/706,831, Final Office Action dated Jun. 24, 2016", 20 pgs.

"U.S. Appl. No. 14/706,831, Non Final Office Action dated Dec. 3, 2015", 19 pgs.

"U.S. Appl. No. 14/706,831, Notice of Allowance dated Sep. 8, 2016", 9 pgs.

"U.S. Appl. No. 14/706,831, PTO Response to Rule 312 Communication dated Dec. 16, 2016", 2 pgs.

"U.S. Appl. No. 14/706,831, Response filed Mar. 3, 2016 to Non Final Office Action dated Dec. 3, 2015", 10 pgs.

"U.S. Appl. No. 14/706,831, Response filed Aug. 24, 2016 to Final Office Action dated Jun. 24, 2016", 9 pgs.

"International Application Serial No. PCT/US2015/029773, International Preliminary Report on Patentability dated Nov. 24, 2016", 8 pgs.

"International Application Serial No. PCT/US2015/029773, International Search Report dated Aug. 10, 2015", 2 pgs.

"International Application Serial No. PCT/US2015/029773, Written Opinion dated Aug. 10, 2015", 6 pgs.

Gee, et al., "Imaging & Signal Processing Detecting crops and weeds in precision agriculture", SPIE Newsroom. DOI: 10.1117/2.1200809.1226,NPL, (Sep. 9, 2008), 6 pgs.

Ji, et al., "Crop-row detection algorithm based on Random Hough Transformation", Mathematical and Computer Modelling, NPL, (2011), 5 pgs.

* cited by examiner

US 10,223,588 B2

IMAGE FILTER BASED ON ROW IDENTIFICATION

CLAIM OF PRIORITY

This application is a continuation of U.S. patent application Ser. No. 14/706,831, filed May 7, 2015, which claims the benefit of priority to U.S. Provisional Patent Application Ser. No. 61/991,260, filed May 9, 2014, which is incorporated herein in its entirety.

TECHNICAL FIELD

This application is generally directed to computer vision and more specifically to image filtering based on row identification.

BACKGROUND

Image based facilitators to agricultural applications, such as navigating an agricultural vehicle through a field capture images of the agricultural environment. In such applications, a sensor captures electronic representations (e.g., images) of the agricultural environment (e.g., field, grove, etc.), referred to herein as images. These images are then used as inputs into agricultural equipment (AEQ) steering mechanisms—to provide steering parameters to the AEQ navigating rows (e.g., crop rows or furrows)—allowing the AEQ to navigate the field without human input.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
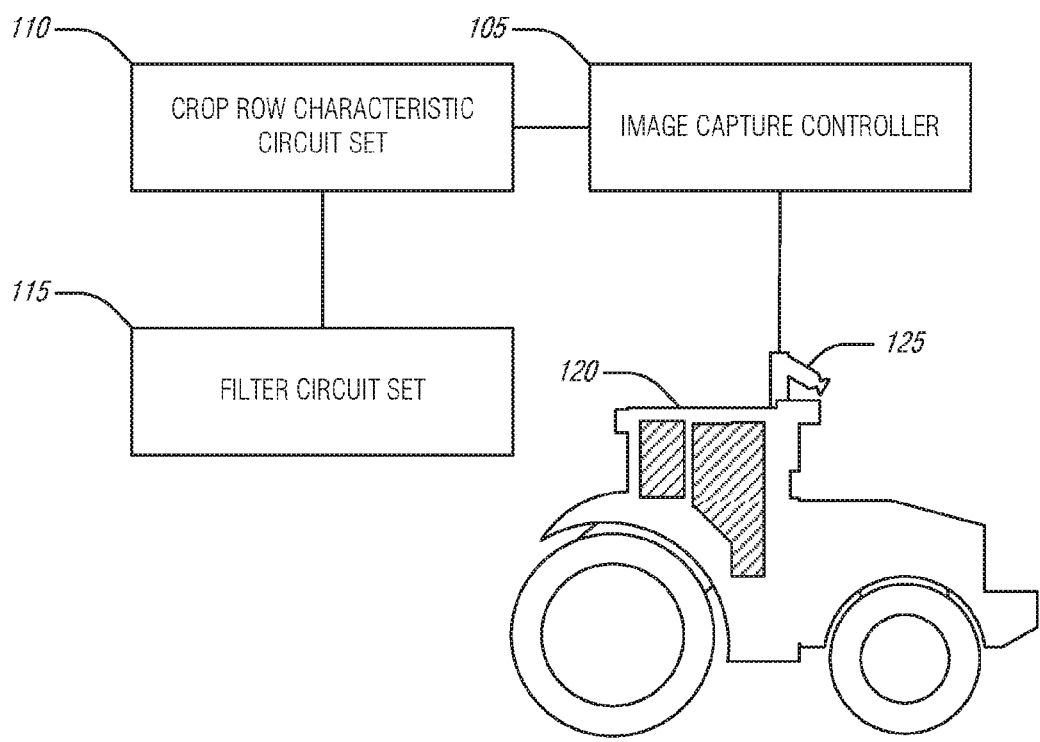
FIG. 1 illustrates a block diagram of an example of a system for an image filter based on row identification, according to an embodiment.

Images are captured for navigational purposes of AEQ. Such images can be also be used for a number of applications, including identifying foreign objects, crop blight, weeds, germination, or other crop characteristic analysis. The analysis and processing to implement these applications can be complicated and compute intensive. Part of these complications can stem from requisite analysis to determine where crops should be, for example, given a complex natural environment.

Using the row, or furrow, characteristics (e.g., centers, edges, etc.) in the image can reduce the complexity of image processing. U.S. Patent Publication No. 2014/0254861 describes a technique to discover these row characteristics, referred to herein as a cascaded Hough transform. As row characteristics may be computed in a steering application, using these characteristics for further image processing provides added computational efficiency in other processes.

Crop row characteristics can form the basis for image partitioning using known or believed facts about a given crop in the image, such as crop row width, canopy width, crop height, planting metrics (e.g., when was the crop planted, application of growth facilitators (e.g., food, fertilizer, pesticide, etc.), etc.) among others. These facts can be applied to the determined row characteristics as a function, for example, of an element of the image (e.g., pixel in the image, row of pixels etc.) with the row characteristics as a parameter. Thus, for example, elements of the image can be classified as expected crops if their colors are within that subset of the function's domain which produces an output that is within the subset of the filter's range corresponding to the expected crops. Moreover, the image from which the row characteristics were determined can be re-used, resulting in additional resource savings, by being provided to a secondary processor to perform one or more of the additional applications.

A system to perform an image filter based on row identification can catalogue elements of an crop environment image based on the crop row characteristic and a filter function. In an example, the cataloging results in a mask that can be applied to the image. Elements within the mask, for example, can be considered classified according to the specific filter. For example, if it is a crop pixel filter function, the mask covers pixels in the image representing crops. In an example, the mask elements can store a plurality of values corresponding to the classification. These values can be used to weight corresponding image elements in the classification. Thus, given three values of 0 (not masked), 1 (partially masked), and 2 (fully masked), corresponding image elements can be classified as, for example, all of crop pixels, partial crop pixels, and non-crop pixels.

Filter functions take the crop row characteristic as an input parameter. That is, filter function output is constrained to the row characteristic input. These functions can be constant or vary in space. Thus, given a constant crop width, a constant crop pixel function can be used to determine crop pixels from the image. Variable functions can address image distortions from the subject (e.g., convergence of straight lines in the distance, etc.), or varying conditions (e.g., a geographic coordinate where crop type changes).

The catalogued elements can be used to simplify image processing for other agricultural applications. For example, assuming a crop colored plant in an area that should be a furrow is a weed, automated weed detection can be enhanced by not analyzing areas of the image where crops should be, such as crop rows. Thus, the image can be segmented into different areas of interest, not only reducing the amount of data to be processed for various applications, but also giving additional context (e.g., crop vs. non-crop space) to simplify decision making.

Examples of the additional decision making can include a variety of crop related surveys, such as a crop density, crop germination, crop height, or contamination (e.g., pests such as living organisms, chemical pollutants, etc.) surveys. For example, given a planting metric, such as what, when, and where a crop was planted, the survey analysis can constrain itself to crop elements in the image. In an example, these surveys can be performed contemporaneous with the image capture, and thus provide real-time output of any of these metrics. In an example, real-time crop metrics can be used to control application of a crop product, such as fertilizer, insecticide, herbicide, fungicide, etc. The reduced computation of the secondary processing that the crop row characteristic filter results provide, allows for greater realization of real-time crop analysis and crop product application in the field.

FIG. 1 illustrates a block diagram of an example of a system 100 for an image filter based on row identification. The system 100 can include an image capture controller 105 coupled to a sensor 125—such as a camera (e.g., visible light, ultraviolet, infrared, monochrome, color, monocular, stereoscopic, etc.), solid state light detection and ranging (LIDAR), or mechanical LIDAR, among others, a crop row characteristic module 110, and a filter module 115. Some or all of the image capture controller 105, the crop row characteristic module 110, and the filter module 115 can be on the AEQ 120. Remote components are communicatively coupled to AEQ 120 components via one or more wireless networks.

The image capture controller 105 can be arranged to receive an image, e.g., from the sensor 125. In an example, the image capture controller 105 can be a sensor (e.g., the sensor 125, such that the image capture controller 105 and the sensor 125 are the same unit) affixed to a vehicle (e.g., the AEQ 120). In an example, the image capture controller 105 can retrieve the image from another component (e.g., a sensor 125 affixed to the vehicle 120, a database, video stream, etc.). In an example, the image can include any one or more of color information, depth information (e.g., as measured by tune-of-flight from an emitter (e.g., infrared emitter), depth pattern, etc.), or luminance information. In an example, the image controller 105 is arranged to capture the image during operation of the AEQ 120 in the environment that the AEQ 120 is operating. Thus, the captured images are real-time with the operation of the AEQ 120 and include the agricultural environment as the subject.

The crop row characteristic circuit set 110 can be arranged to gather a plurality of crop row characteristics. Example crop row characteristics may include a crop row center or a crop row edge. In an example, the crop row characteristic circuit set 110 can be arranged to obtain at least one row characteristic. The crop row characteristic circuit set 110 can be arranged to calculate the crop row characteristic from the image. In an example, such calculation can include applying a feature threshold to identify elements of interest in the image. In an example, the feature threshold can be a color threshold. For example, if the crop color is green, the furrow color is brown, the image can be filtered and non-green information (e.g., pixels) removed. To identify a crop row center, post filtered pixels—e.g., green pixels for a green crop after brown furrow pixels are filtered out—are removed when they are laterally bordered by nothing (e.g., a removed or filtered pixel) and a remaining pixel. This processes is repeated until there are no more pixels to remove, resulting in a string of pixels approximating the crop row center. To find a crop row edge, any post filtered pixel that has a similar pixel in both lateral edges (e.g., a green pixel with a green pixel to the left and to the right) is removed. Here the remaining pixels are the crop row edges. Once the elements of interest are identified via feature thresholding, the crop row characteristic circuit set 110 can be arranged to perform a Hough transform on the elements of interest to identify a line in the image that corresponds to the row characteristic. In an example, the row center is a crop row or adjacent to a crop row.

The crop row characteristic circuit set 110 can also be arranged to obtain a set of expected crop row characteristics, such as crop width, row spacing, crop type, date information (e.g., when planted, when fertilizer was applied, etc.), crop color, among others. In an example, the crop row characteristic module 110 can be arranged to provide a user interface to accept user input as to one or more of the crop characteristics. For example, the user can input an expected crop width, height, color, or other value that can be used with the filter as described below. In an example, the crop row characteristic module 110 can be arranged to retrieve one or more crop characteristics from another component, such as a database, web service, additional sensor, etc. The expected crop row characteristics are not real-time measurements of the crops themselves, but may be based on previous measurements. For example, an average of previously measured crop height can be used as the expected crop height. In an example, a crop width, or other metric, can be determined from an average of previously determined crop elements corresponding to a plurality of previous images of crops of the same type as the crop row.

Figure 2A:
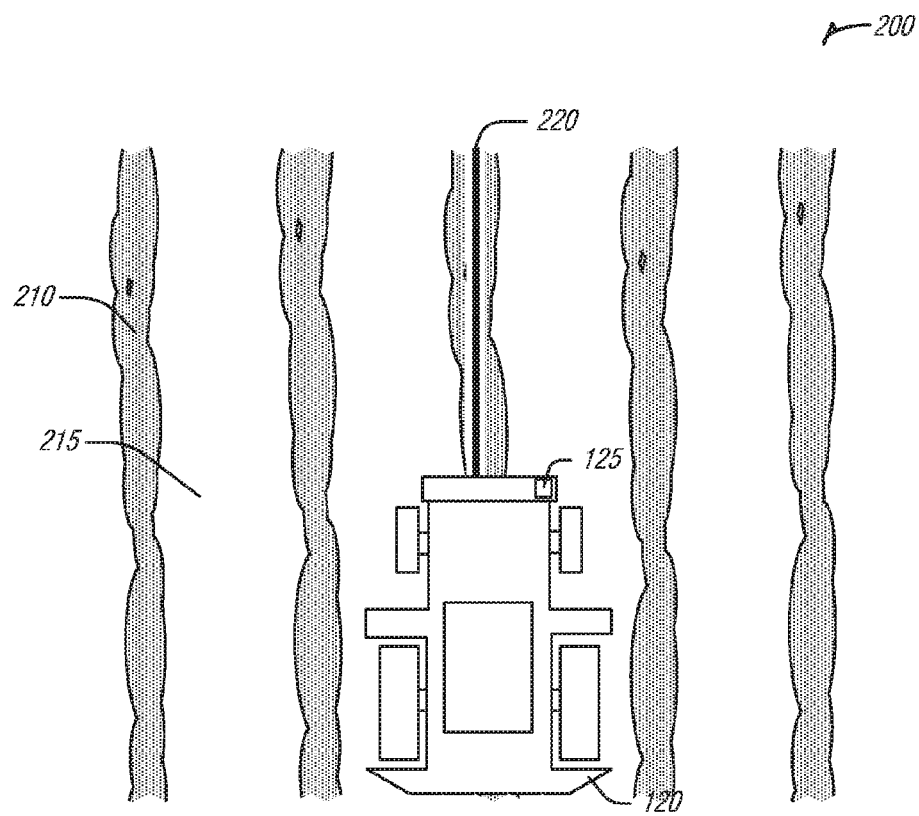
FIGS. 2A and 2B illustrate example perspectives of an agricultural vehicle in a crop environment facilitating image capture and row identification, according to an embodiment.

The filter circuit set 115 can be arranged to obtain a filter corresponding to the set of expected crop row characteristics of the crop row on which the AEQ 120 is operating. The filter can be a function that takes a special value as an argument. Thus, the filter can be a Gaussian distribution of crop height—with the mean at the crop row characteristic (e.g., center)—that is scaled based on the expected crop height, width, etc. In an example, the filter can include a color component, such that, for example, the filter embodies an expected color histogram for the crop at a given time after planting with certain growth inputs (e.g., feed, water, etc.) accounted for. In an example, the filter can be horizontally constant to an expected crop width constant. Thus, the filter can indicate a boundary from the crop row characteristic within which one would expect to see crop elements and outside of which one would not expect to see crop elements. In this example, the fixed width can be periodic. Thus, bands of expected crop elements and a elements that are not expected crop elements can be formed from the filter. In an example, the filter using the crop width, or other metric, is based on a perspective of a sensor (e.g., the sensor 125) that captured the image. For example, as illustrated in FIG. 2A, the camera's 12 perspective can cause the straight crop rows to appear as convergent lines in the image. Thus, a constant width filter will narrow as the horizon is approached in the image to maintain an appropriate distance from the row characteristic.

The filter circuit set 115 can also be arranged to categorize elements in the image based on applying the filter to the image. In an example, the filter is anchored on the crop row characteristic. In an example, categorizing the elements on the image can include the filter circuit set 115 being arranged to create a mask for the image. This mask can then be applied to the image. A category of crop elements can be applied to features (e.g., pixels) in the image based on whether they are inside, or outside of the mask. In an example, features within the mask are given a crop-element category. In an example, feature that are not within the mask are categorized as non-crop elements. In an example, the mask can be multi-valued, such that more than a simple in-out categorization is possible. For example, one may visualize the mask as a grey scale contour from black to white. One can consider a white value to be wholly within the mask and a black value to be wholly without. However, the grey values can be assigned a, in value based on the percentage of black or white of the particular grey. In an example, the grey-type value of the mask can be quantized, creating bands within the mask. A particular category can be assigned to each band of the mask and applied image features covered by the band.

In an example, the mask can be composed of one or more geometric shapes centered, or otherwise anchored, on the row characteristic. In an example, edges of the one or more shapes can correspond to a crop row characteristic (e.g., crop width) distance from the row characteristic. In an example, the distance can be halved, or otherwise fractionalized to correspond to the anchor point—e.g., if the anchor point is the crop row center, and the characteristic is the crop width, then the edge is set at one-half the crop width distance from the row center. In an example, the filter includes a parameter that corresponds to a feature of the image, varies in response to variations in the feature, and modifies the edges of the one or more geometric shapes. Thus, as discussed above, the sensor's 125 perspective can modify the representation of the crop rows in an image, and these modifications can be accounted for by the filter. In an example, the parameter is a multiplier, applied to a constant crop width, that changes in response to a pixel row in a raster representation of the image. Thus, as one moves pixels rows towards the bottom of the image, the width filter can increase to account for the larger representation of the crops closer to the sensor 125. In an example, the parameter is a second crop row characteristic measured perpendicular to a respective crop row characteristic. Such perpendicular characteristics can include crop width and height. For example, for a crop planted some distance apart within a row, a variable width, instead of a constant width, may be observed. Such a perpendicularly measured characteristic, varying along the crop row characteristic, can capture this scenario.

In an example, the system 100 can include a discriminator to test differences between the filtered/categorized image elements and the expected crop row characteristics. Thus, for example, the discriminator can be arranged to compare non-crop elements against a desired non-crop element model (e.g., one or more expected crop row characteristics) to determine a deviation in the non-crop elements. For example, the furrow characteristics can include a shade of brown. When a non-crop picture element (e.g., pixel) varies too far from the anticipated shade of brown, a deviation can be flagged. In an example, the discriminator can be arranged to store, at least a portion of, the image corresponding to the flagged deviation when the deviation is outside of a deviation threshold. The discriminator can be arranged to determine such deviation threshold from an external source, such as user input or a database. The addition of the deviation threshold to the filter permits simplification of the filter options such that a filtered deviation can be ignored if, for example, the operator has additional information suggesting that the filtered deviation is too strict.

Discriminator flagging can be used as input into a secondary processor, applicator, or other device to address crop row health. For example, the AEQ 120 can include an applicator to apply a crop product (e.g., pesticide, herbicide, insecticide, fertilizer, plant growth regulator, etc.) to the crop row. Thus, if a crop colored element is categorized as a non-crop element, herbicide can be automatically applied to the area. The interface between the discriminator and the applicator can be direct. For example, the interface can be arranged to package the crop elements into a form that directly controls the applicator.

In an example, the interface can be indirect, such that the discriminator flag, or even the raw filtered image, is passed to the secondary processor for additional analysis prior to the applicator. In an example, the interface can be arranged to package the crop row elements for delivery to the secondary processor. In these examples, the applicator can be arranged to control a rate, including none, based on the output of the secondary processor. In an example, the crop product application can be contemporaneous to capturing the image. Thus, as the AEQ 120 is navigating the crop row, an identified growth deficiency in the crop can be immediately addressed.

Interface packaging can take on several forms. For example, the interface can be arranged to filter the image for the crop elements by removing non-crop elements. The opposite type of packaging can also be applied, whereby crop elements are removed from the image. In either case, the package can include the filter. Accordingly, the secondary processor can apply the filter to remove the unwanted elements. Such a packaging of the image analysis can provide the effect of the crop row characteristic circuit set 110 and filter analysis while allowing the secondary processor access to the raw image for other analysis. In an example, the interface can be arranged to apply the filter to the image and create a modified image with the filtered elements removed. Such a packaging allows for a smaller image that still retains the pertinent information the secondary processor can use. In an example, the packaged crop row elements can be streamed to the secondary processor. Thus, the secondary processor can apply the crop row characteristic circuit set 110 and filter analysis in real-time.

In an example, the secondary processor is a crop index calculator. In an example, the calculator is a Green Leaf Index calculator. In an example, the secondary processor, or the crop row characteristic circuit set 110 is arranged to calculate crop density based on the crop elements. An example, the secondary processor, or the crop row characteristic circuit set 110, can be arranged to store a portion of the image corresponding to crop elements in response to determining that the crop density is beyond a threshold. In an example, the secondary processor, or the crop row characteristic circuit set 110, can be arranged to estimate a crop germination metric from the crop density and a planting metric (e.g., when the crop was planted, fertilizer applied, soil type, etc.). In an example, the secondary processor, or the crop row characteristic circuit set 110, can be arranged to estimate crop height based on crop elements, a planting metric, and crop type.

Figure 2B:
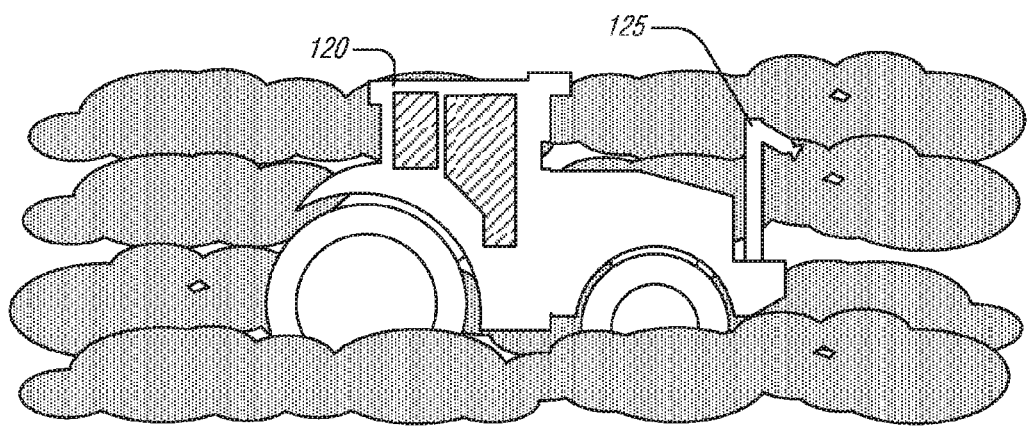

FIGS. 2A and 2B illustrate example perspectives of the AEQ 120 in a crop environment 200 facilitating image capture and row identification. As illustrated in FIG. 2A, the crop rows are darkened (e.g., crop row 210) and the furrows (e.g., furrow 215) are between the crop rows. The crop row center 220 is the center of the crop row that the agricultural vehicle 205 is currently on. Image sensor 225 is positioned to capture the image. FIG. 2B illustrates a profile view of the scene of FIG. 2A.

Figure 3:
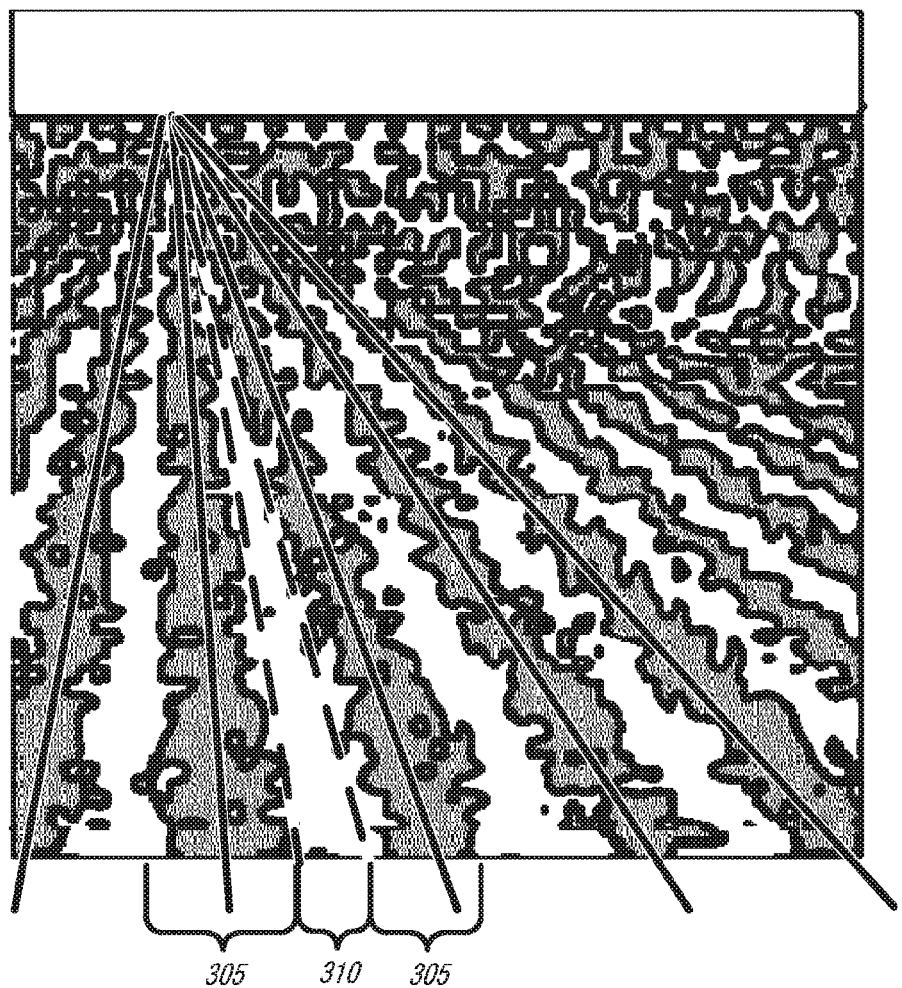
FIG. 3 illustrates an example image with elements for image filtering, according to an embodiment.

FIG. 3 illustrates an example image 300 with elements for image filtering. The image 300 includes solid lines representing determined crop row centers. The crop width 305, as noted above, is a crop characteristic. Non-crop elements 310 can be determined in relation to the row centers and the crop characteristics. As illustrated, this can be seen as the portion of the image 300 between crop row centers when the crop width 305 is taken into account. FIG. 3 also illustrates the modified representation of the field given the camera's perspective and optical characteristics.

Figure 4:
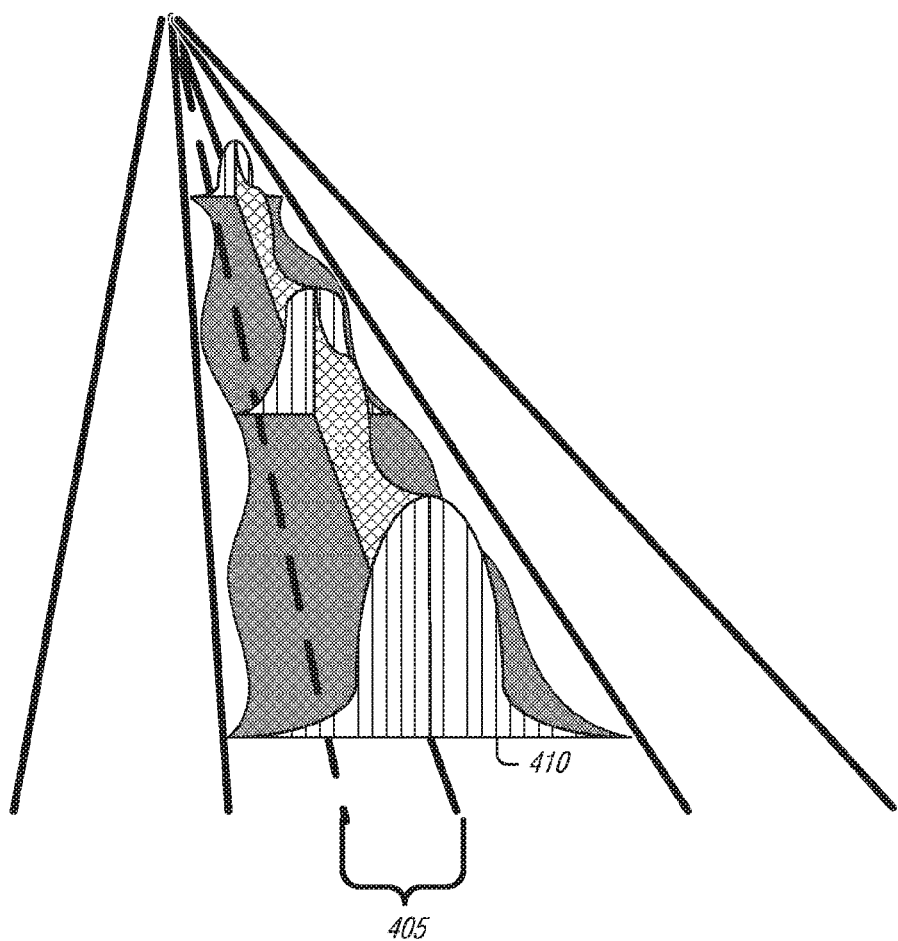
FIG. 4 illustrates an example of a filter function on row identification, according to an embodiment.

FIG. 4 illustrates an examples of a filter functions anchored on row identification. In an example, a constant filter function results in the area 405 between the row center that is in the middle (third from the left or right) and the dashed line. In an example, the function can include the crop width perpendicular to the crop row. As illustrated, this function is modified to address the image sensor's perspective as captured on the image. In an example, a plurality of functions can be used in this manner. For example, a first function can be used to encompass the crop coverage from the crop row center and a second function can be used to encompass a transitional area between the crop coverage and an area that should be devoid of crops, such as a furrow.

FIG. 4 also illustrated a varying function 410. As illustrated, the filter function 410 is three dimensional, with the z coordinate running along the crop row, the x coordinate representing a horizontal component from the row center, and the y coordinate representing a vertical component from the row center. The shaded portion represents the and z components combined in an area sitting at the ground. The vertical striped portions represent slices of the filter function in the x-y plane at different values of z. Similarly, the cross-hatched portions represent a slice of the y-z plane at the x coordinate corresponding to the crop row center. Such varying functions can provide for a sophisticated model of the expected crop characteristics. Once the model is created, the filter function 410 can be modified into a final filter by being plotted in three dimensions, such as via a graphics processor, mapped the crop row via transformation (e.g., translation, skew, rotation, etc.), and rendered in two dimensions to create a mask. In an example the variable mask features described above (e.g., more levels to the mask than simply covering or not covering an element) can be represented in the two dimensional image as alpha channels.

Figure 5:
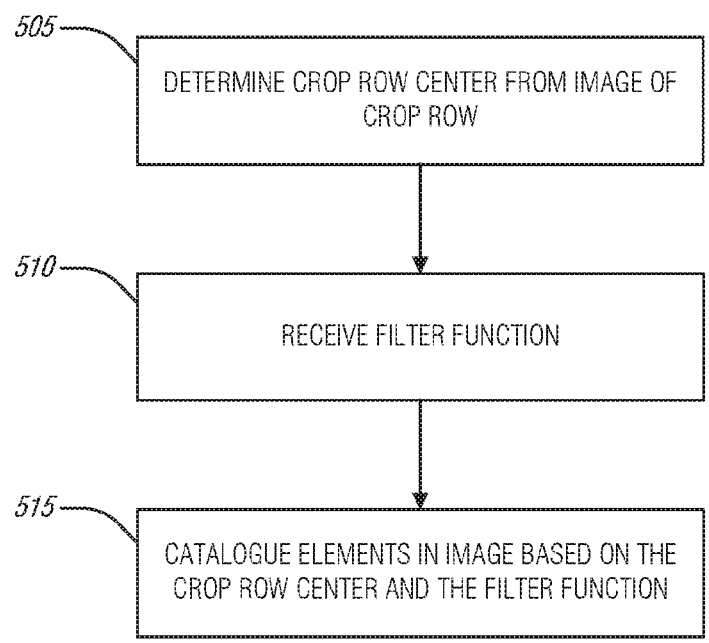
FIG. 5 illustrates a flow diagram of an example of a method for an image filter based on row identification, according to an embodiment.

FIG. 5 illustrates a flow diagram of an example of a method 500 for an image filter based on row identification. Operations of the method 500 are carried out on computing hardware, such as those components described above with respect to FIG. 1, or below with respect to FIG. 6.

At operation 505 a crop row center represented in a digital image of the crop row can be determined. Although the example of a crop row center is discussed with respect to FIG. 5, other crop row characteristics, such as a crop row edge, may be substituted for the crop row center in the examples. In an example, determining the crop row center can include applying a feature threshold to identify elements of interest in the digital image and performing a Hough transform on the elements of interest to generate a crop row center line.

At operation 510 a filter function can be received. In an example, the filter function is a crop width constant. In an example, the crop width constant is received from a user via a user interface. In an example, the crop width constant is determined from an average of previously determined crop pixels corresponding to a plurality of previous digital images of crops of a same type as the crop row. In an example, the filter function is based on a perspective of a sensor that captured the digital image. In an example, the filter function can be continuous.

At operation 515 elements in the digital image can be catalogued based on the crop row center and the filter function. In an example, cataloguing the elements can include creating a mask for the digital image. In an example, elements of the mask can have a depth, indicating what amount of an underlying corresponding element is included. This can be visualized by a white mask with a variety of transparency levels superimposed on the digital image. In an example, the mask can be a bitmap implementing a binary decision as to what elements of the image are included. In an example, the mask can include one or more geometric shapes centered on the crop row center with edges corresponding to the filter function with the crop row center as its domain. The mask can be applied to the image and elements not covered (or covered, but not both, in an alternative example) by the mask can be classified according to the filter function. For example, if the filter function circumscribes a crop row, then the covered pixels can be classified as crop row pixels.

In an example, where the function is not constant, the filter function includes a parameter corresponding to the digital image, and wherein the parameter changes in response to a feature of the digital image to determine the edges of the geometric shape. Thus, the edges of the geometric shape can be varied in response to the crop row center on the image. In an example, where the function is continuous with respect to this parameter over the entire image, a different value may be outputted from the filter function for each element. Thus, no specific geometric shape is bounded by the filter function, but rather, individual elements are weighted as to their import given the specific filter function. In an example, the parameter can be a multiplier applied to a constant crop width, the multiplier changing in response to a pixel row in a raster representation of the digital image.

In an example, elements in the image can be classified as crop elements or non-crop elements. In an example, non-crop elements are determined by taking the elements left in the image after remove crop elements directly determined by a filter function. Conversely, crop elements can be identified in a similar manner when non-crop elements are determined by applying the filter function.

In an example, the method 500 can be rephrased as determining characteristics of an agricultural crop row as a function of individual elements of the image. In an example, a property of the image element can include a location in a direction perpendicular to a crop row, of the place to which the element corresponds—e.g., between the image and the subject (e.g., real-world) represented by the image. An example, the location is identified by a Flough transform based crop row identification mechanism. In this example, a continuous (rather than on-off) weighting of elements (e.g., color components) or thresholds across the row-spacing is enabled. The subdivision of the row-space into a plurality of (not-necessarily-disjoint) subspaces, and numerous non-linear interactions among elements or ensembles of elements at varying distances from the row center. For example, accumulation of a canopy histogram over all or parts of a field can be constructed that shows the average canopy presence as a function of distance from the row center. In an example, correlation of the crop color with a ramp function of distance from the row center can be determined to anticipate row curvature at some distance from the camera, e.g., for use in aiding a steering system.

Additional operations can be performed based on the catalogued elements described above.

In an example, non-crop elements can be compared against desired non-crop elements to determine a deviation; and flagging the deviation. Such deviations can include weed detection (e.g., by noting crop colors in non-crop pixels), foreign bodies, infestations, etc. In an example, pesticide (e.g., herbicide, insecticide, fungicide, etc.) application can be controlled based on the flagged deviation. In an example, the deviation can be compared against a determined deviation threshold. If the deviation is beyond (e.g., above or below depending on the threshold measurement direction) the threshold, a portion of the image, such as that included in the mask, can be stored for later analysis.

In an example, the catalogued elements can be packaged and communicated to a secondary processor. Packaging can include applying the mask to the image, and removing masked or unmasked pixels, and communicating the result as an element specific image to the secondary processor. In an example, packaging can include simply sending the mask to the secondary processor to use with its own image. In an example, the packaging can include bundling the image and the mask together for the secondary processor (e.g., so that the secondary processor does not need to obtain its own image by another mechanism). In an example, the packaging is a stream of image elements (e.g., video) with corresponding masks.

In an example, the packaged elements are classified as either crop elements or non-crop elements. In an example, the secondary processor is a crop index calculator. In an example, the crop index calculator is arranged to calculate a Green Leaf Index. In an example, the secondary processor can be arranged to determine crop density. In an example, the portion of the image corresponding to the mask from which the crop density determination was made can be stored for later analysis when, for example, it goes beyond a crop density threshold. In an example, the secondary processor can be arranged to estimating crop germination from, for example, the crop density and a planting metric (e.g., what type of crop, when was the crop planted, what is a normal growth rate, etc.). In an example, the secondary processor can be arranged to estimate crop height based on the crop elements and a planting metric in a manner similar to that for crop density. In an example, the secondary processor can control, or can information a controller to control, a rate of applying a crop product (e.g., fertilizer, pesticide, insecticide, etc.)

Figure 6:
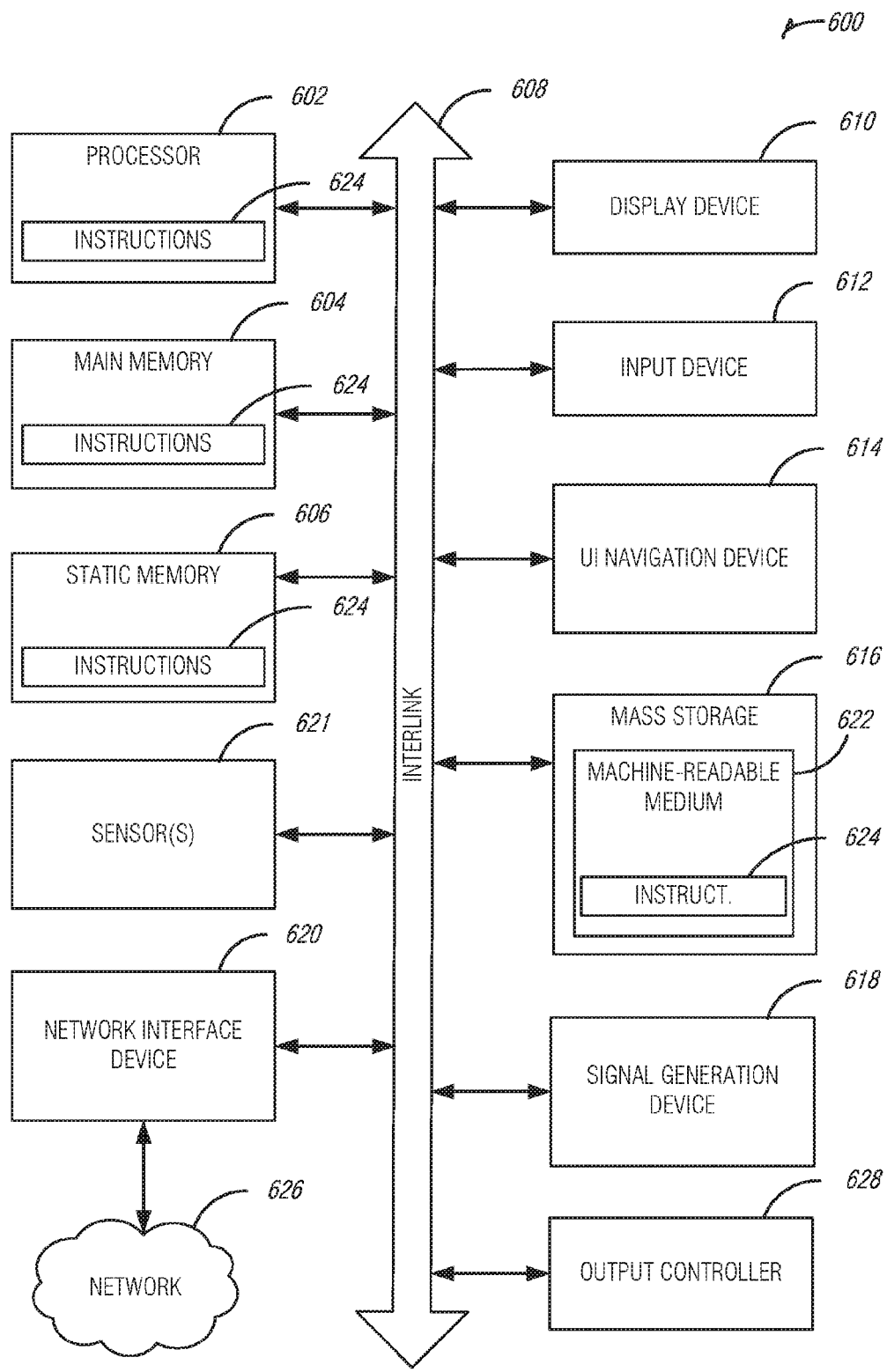
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UT) navigation device 614 (e.g., a mouse). In an example, the display unit 610, input device 612 and 111 navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old. Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MEMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes & Examples

Example 1 includes subject matter (such as a device, apparatus, or machine) comprising: an image capture controller to: interface with a camera mounted on agricultural equipment; and obtain an image of a crop row, from the camera, during operation of the agricultural equipment corresponding to a field with the crop row; a crop row characteristic circuit set to: calculate a crop row center from the image of the crop row; and obtain a set of expected crop characteristics of the crop row; and a filter circuit set to: obtain a filter corresponding to the set of expected crop characteristics of the crop row; and categorize elements in the image into categories based on applying the filter to the image, the filter anchored on the crop row center.

In Example 2, the subject matter of Example 1 may include, wherein to determine the crop row center includes the crop row characteristic circuit set to: apply a feature threshold to identify elements of interest in the image; and perform a Hough transform on the elements of interest to generate a crop row center line.

In Example 3, the subject matter of any one of Examples 1 to 2 may include, wherein the filter is horizontally constant to a crop width.

In Example 4, the subject matter of any one of Examples 1 to 3 may include, wherein the crop width is received from a user via a user interface.

In Example 5, the subject matter of any one of Examples 1 to 4 may include, wherein the crop width constant is determined from an average of previously determined crop elements corresponding to a plurality of previous images of crops of a same type as the crop row.

In Example 6, the subject matter of any one of Examples 1 to 5 may include, wherein the filter using the crop width function is based on a perspective of a sensor that captured the image.

In Example 7, the subject matter of any one of Examples 1 to 6 may include, wherein to categorize elements in the image based on the crop row center and the filter includes the filter circuit set to: create a mask for the image, the mask including one or more geometric shapes centered on the crop row center with edges corresponding to a half crop width distance function from the crop center; apply the mask to the image; and assign a category of crop element to elements of the image within the mask.

In Example 8, the subject matter of any one of Examples 1 to 7 may include, wherein the filter is not constant and includes a parameter corresponding to a feature of the image, and wherein the parameter changes in response to changes in the feature to determine the edges of the geometric shape.

In Example 9, the subject matter of any one of Examples 1 to 8 may include, wherein the parameter is a multiplier applied to a constant crop width, the multiplier changing in response to a pixel row in a raster representation of the image.

In Example 10, the subject matter of any one of Examples 1 to 9 may include, wherein to categorize elements in the image includes the filter circuit set to assign a non-crop element category to elements that are not categorized as crop elements.

In Example 11, the subject matter of any one of Examples 1 to 10 may include, 11. The system of claim 10 a discriminator to: compare non-crop elements against a desired non-crop element model to determine a deviation in the non-crop elements; and flag the deviation.

In Example 12, the subject matter of any one of Examples 1 to 11 may include, an applicator to control crop product application based on the flagged deviation.

In Example 13, the subject matter of any one of Examples 1 to 12 may include, wherein the discriminator is to: determine a deviation coverage threshold; and store at least a portion of the image corresponding to the flagged deviation in response to being outside of the deviation coverage threshold.

In Example 14, the subject matter of any one of Examples 1 to 13 may include an output interface to: package the crop elements; and deliver the packaged crop elements to a secondary processor.

In Example 15, the subject matter of any one of Examples 1 to 14 may include, wherein to package the crop elements includes the output interface to create a secondary processor filter for the image for the crop elements, and wherein to deliver the packaged crop elements includes the output interface to communicate the filter to the secondary processor.

In Example 16, the subject matter of any one of Examples 1 to 15 may include, wherein to package the crop elements includes the output interface to remove non-crop elements from the image to create a crop element image, and to deliver the packaged crop elements includes the output interface to communicate the crop element image to the secondary processor.

In Example 17, the subject matter of any one of Examples 1 to 16 may include, wherein to package the crop elements includes the output interface to stream the crop elements to the secondary processor.

In Example 18, the subject matter of any one of Examples 1 to 17 may include, wherein the secondary processor is a crop index calculator.

In Example 19, the subject matter of any one of Examples 1 to 18 may include, wherein the crop index calculator calculates a Green Leaf Index.

In Example 20, the subject matter of any one of Examples 1 to 19 may include an applicator to control a rate of crop product application based on output of the secondary processor.

In Example 21, the subject matter of any one of Examples 1 to 20 may include, wherein the crop product application is contemporaneous to capturing the image.

In Example 22, the subject matter of any one of Examples 1 to 21 may include, wherein the crop product is at least one of fertilizer, plant growth regulator, herbicide, or insecticide.

In Example 23, the subject matter of any one of Examples 1 to 22 may include, wherein the crop row characteristic circuit set is to calculate crop density based on the crop elements.

In Example 24, the subject matter of any one of Examples 1 to 23 may include, wherein the crop row characteristic circuit set is to store a portion of the image corresponding to the crop elements in response to determining that the crop density is outside of a density threshold.

In Example 25, the subject matter of any one of Examples 1 to 24 may include, wherein the crop row characteristic circuit set is to estimate a crop germination metric from the crop density and a planting metric.

In Example 26, the subject matter of any one of Examples 1 to 25 may include, wherein the crop row characteristic circuit set is to estimate crop height based on the crop elements, planting metric, and crop type.

Example 27 includes subject matter such as a method, means for performing acts, machine readable medium including instructions that when performed by a machine cause the machine to performs acts, or an apparatus to perform—alone or in addition to the subject matter of any of claims 1 to 26, comprising: calculating a crop row center represented in an image of the crop row; obtaining a filter corresponding to a set of expected crop characteristics of the crop row; and categorizing elements in the image into categories based on applying the filter to the image, the filter anchored on the crop row.

In Example 28, the subject matter of Example 27 may include, wherein determining the crop row center includes: applying a feature threshold to identify elements of interest in the image; and performing a Hough transform on the elements of interest to generate a crop row center line.

In Example 29, the subject matter of any one of Examples 27 to 28 may include, wherein the filter is horizontally constant to a crop width constant.

In Example 30, the subject matter of any one of Examples 27 to 29 may include, wherein the crop width constant is received from a user via a user interface.

In Example 31, the subject matter of any one of Examples 27 to 30 may include, wherein the crop width constant is determined from an average of previously determined crop elements corresponding to a plurality of previous images of crops of a same type as the crop row, crop elements being in the elements and crop element being a category of the categories.

In Example 32, the subject matter of any one of Examples 27 to 31 may include, wherein the crop width function is based on a perspective of a sensor that captured the image.

In Example 33, the subject matter of any one of Examples 27 to 32 may include, wherein categorizing elements in the image based on the crop row center and the filter includes: creating a mask for the image, the mask including one or more geometric shapes centered on the crop row center with edges corresponding to a half crop width distance function from the crop center; applying the mask to the image; and assigning a category of crop element to elements of the image within the mask.

In Example 34, the subject matter of any one of Examples 27 to 33 may include, wherein the crop width distance function is not constant and includes a parameter corresponding to a feature of the image, and wherein the parameter changes in response to changes in the feature to determine the edges of the geometric shape.

In Example 35, the subject matter of any one of Examples 27 to 34 may include, wherein the parameter is a multiplier applied to a constant crop width, the multiplier changing in response to a pixel row in a raster representation of the image.

In Example 36, the subject matter of any one of Examples 27 to 35 may include, wherein categorizing elements in the image includes assigning a non-crop element category to elements that are not categorized as crop elements.

In Example 37, the subject matter of any one of Examples 27 to 36 may include comparing non-crop elements against a desired non-crop element model to determine a deviation in the non-crop elements; and flagging the deviation.

In Example 38, the subject matter of any one of Examples 27 to 37 may include controlling crop product application based on the flagged deviation.

In Example 39, the subject matter of any one of Examples 27 to 38 may include determining a deviation coverage threshold; and storing at least a portion of the image corresponding to the flagged deviation in response to being outside of the deviation coverage threshold.

In Example 40, the subject matter of any one of Examples 27 to 39 may include packaging the crop elements; and delivering the packaged crop elements to a secondary processor.

In Example 41, the subject matter of any one of Examples 27 to 40 may include, wherein packaging the crop elements includes creating a secondary processor filter for the image for the crop elements, and wherein delivering the packaged crop elements includes communicating the filter to the secondary processor.

In Example 42, the subject matter of any one of Examples 27 to 41 may include, wherein packaging the crop elements includes removing non-crop elements from the image to create a crop element image, and delivering the packaged crop elements includes communicating the crop element image to the secondary processor.

In Example 43, the subject matter of any one of Examples 27 to 42 may include, wherein packaging the crop elements includes streaming the crop elements to the secondary processor.

In Example 44, the subject matter of any one of Examples 27 to 43 may include, wherein the secondary processor is a crop index calculator.

In Example 45, the subject matter of any one of Examples 27 to 44 may include, wherein the crop index calculator calculates a Green Leaf Index.

In Example 46, the subject matter of any one of Examples 27 to 45 may include controlling rate of crop product application based on output of the secondary processor.

In Example 47, the subject matter of any one of Examples 27 to 46 may include, wherein the crop product application is contemporaneous to capturing the image.

In Example 48, the subject matter of any one of Examples 27 to 47 may include, wherein the crop product is at least one of fertilizer, plant growth regulator, herbicide, or insecticide.

In Example 49, the subject matter of any one of Examples 27 to 48 may include calculating crop density based on the crop elements.

In Example 50, the subject matter of any one of Examples 27 to 49 may include storing a portion of the image corresponding to the crop elements in response to determining that the crop density is outside of a density threshold.

In Example 51, the subject matter of any one of Examples 27 to 50 may include estimating crop a germination metric from the crop density and a planting metric.

In Example 52, the subject matter of any one of Examples 27 to 51 may include estimating crop height based on the crop elements, a planting metric, and a crop type.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at, least, one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed. Description, with each claim standing on its own as a separate embodiment. The scope of the embodiments should be determined with reference to the appended claims, along with the full scope of equivalents to which such claims are entitled.

What is claimed is:

1. A system to filter an image, the system comprising:
    an image capture controller to:
        interface with a sensor; and
        obtain an image of a crop row, from the sensor, during operation of agricultural equipment operating with respect to the crop row;
    a crop row characteristic circuit set to:
        calculate a crop row characteristic from the image of the crop row; and
        obtain a set of expected crop characteristics of the crop row; and
    a filter circuit set to:
        obtain a filter corresponding to the set of expected crop characteristics of the crop row; and
        categorize elements in the image into categories based on applying the filter to the image, including the filter circuit set to:
            create a mask for the image, the mask anchored to the crop row characteristic with edges defined by the filter;
            apply the mask to the image; and
            assign a category of crop element or non-crop element to elements of the image based on application of the mask to the image.

2. The system of claim 1, wherein to determine the crop row characteristic includes the crop row characteristic circuit set to:
    apply a feature threshold to identify elements of interest in the image; and
    perform a Hough transform on the elements of interest to generate a crop row center characteristic line.

3. The system of claim 1, wherein the set of expected crop characteristics are determined from an average of previously determined crop characteristics corresponding to a plurality of previous images of crops of a same type as the crop row.

4. The system of claim 1, wherein the filter is transformed based on a perspective of the sensor that captured the image.

5. The system of claim 1 comprising a discriminator to:
    compare non-crop elements, as determined by a desired non-crop element model, to determine a deviation in the non-crop elements; and
    flag the deviation.

6. The system of claim 5 comprising an applicator to control crop product application based on the flagged deviation.

7. The system of claim 6, wherein the crop product application is contemporaneous to capturing the image.

8. The system of claim 1, wherein the crop row characteristic is a crop row center.

9. The system of claim 1, wherein the crop row characteristic is a crop row edge.

10. The system of claim 1, wherein the image includes at least one of luminance information or depth information.

11. The set of machine readable media of claim 10, wherein the sensor is a camera sensitive to at least one of infrared, visible, or ultraviolet light to produce the luminance information, and wherein the sensor is at least one of a depth camera, solid state LIDAR, or mechanical LIDAR to produce the depth information.

12. A method to filter an image, the method comprising:
  calculating a crop row characteristic represented in an image of the crop row;
  obtaining a filter corresponding to a set of expected crop characteristics of the crop row; and
  categorizing elements in the image into categories based on applying the filter to the image, including:
    creating a mask for the image, the mask anchored to the crop row characteristic with edges defined by the filter;
    applying the mask to the image; and
    assigning a category of crop element or non-crop element to elements of the image based on application of the mask to the image.

13. The method of claim 12 wherein determining the crop row characteristic includes:
  applying a feature threshold to identify elements of interest in the image; and
  performing a Hough transform on the elements of interest to generate a crop row characteristic line.

14. The method of claim 12, wherein the set of expected crop characteristics are determined from an average of previously determined crop characteristics corresponding to a plurality of previous images of crops of a same type as the crop row.

15. The method of claim 12, wherein the filter is transformed based on a perspective of a sensor that captured the image.

16. The method of claim 12 comprising:
  comparing non-crop elements against a desired non-crop element model to determine a deviation in the non-crop elements; and
  flagging the deviation.

17. The method of claim 16 comprising controlling crop product application based on the flagged deviation.

18. The method of claim 17, wherein the crop product application is contemporaneous to capturing the image.

19. The method of claim 12, wherein the crop row characteristic is a crop row center.

20. The method of claim 12, wherein the crop row characteristic is a crop row edge.

21. The method of claim 12, wherein the image includes at least one of luminance information or depth information.

22. The set of machine readable media of claim 21, wherein the sensor is a camera sensitive to at least one of infrared, visible, or ultraviolet light to produce the luminance information, and wherein the sensor is at least one of a depth camera, solid state LIDAR, or mechanical LIDAR to produce the depth information.

23. A set of non-transitory machine readable media including instructions that, when executed by a machine, cause the machine to perform operations comprising:
  calculating a crop row characteristic represented in an image of the crop row;
  obtaining a filter corresponding to a set of expected crop characteristics of the crop row; and
  categorizing elements in the image into categories based on applying the filter to the image, including:
    creating a mask for the image, the mask anchored to the crop row characteristic with edges defined by the filter;
    applying the mask to the image; and
  assigning a category of crop element or non-crop element to elements of the image based on application of the mask to the image.

24. The set of machine readable media of claim 23, wherein determining the crop row characteristic includes:
  applying a feature threshold to identify elements of interest in the image; and
  performing a Hough transform on the elements of interest to generate a crop row characteristic line.

25. The set of machine readable media of claim 23, wherein the set of expected crop characteristics are determined from an average of previously determined crop characteristics corresponding to a plurality of previous images of crops of a same type as the crop row.

26. The set of machine readable media of claim 23, wherein the filter is transformed based on a perspective of a sensor that captured the image.

27. The set of machine readable media of claim 23, wherein the operations further comprise:
  comparing non-crop elements against a desired non-crop element model to determine a deviation in the non-crop elements; and
  flagging the deviation.

28. The set of machine readable media of claim 27, wherein the operations further comprise controlling crop product application based on the flagged deviation.

29. The set of machine readable media of claim 28, wherein the crop product application is contemporaneous to capturing the image.

30. The set of machine readable media of claim 23, wherein the crop row characteristic is a crop row center.

31. The set of machine readable media of claim 23, wherein the crop row characteristic is a crop row edge.

32. The set of machine readable media of claim 23, wherein the image includes at least one of luminance information or depth information.

33. The set of machine readable media of claim 32, wherein the sensor is a camera sensitive to at least one of infrared, visible, or ultraviolet light to produce the luminance information, and wherein the sensor is at least one of a depth camera, solid state LIDAR, or mechanical LIDAR to produce the depth information.

* * * * *

UNITED STATES PATENT AND TRADEMARK OFFICE
CERTIFICATE OF CORRECTION

PATENT NO. : 10,223,588 B2
APPLICATION NO. : 15/437331
DATED : March 5, 2019
INVENTOR(S) : Wilson et al.

It is certified that error appears in the above-identified patent and that said Letters Patent is hereby corrected as shown below:

In the Specification

In Column 2, Line 17, after "pixels", insert --,--

In Column 3, Line 34, delete "tune-of-flight" and insert --time-of-flight-- therefor In Column 3, Line 63, after "Here", insert --,--

In Column 6, Line 36, delete "An" and insert --In an-- therefor

In Column 6, Line 55, delete "205" and insert --120-- therefor

In Column 6, Line 55, delete "225" and insert --125-- therefor

In Column 7, Line 19, after "the", insert --x--

In Column 8, Line 41, delete "An" and insert --In an-- therefor

In Column 8, Line 42, delete "Flough" and insert --Hough-- therefor

In Column 10, Line 32, delete "(UT)" and insert --(UI)-- therefor

In Column 10, Line 33, delete "111" and insert --UI-- therefor

In Column 10, Line 41, delete "(USB)," and insert --(USB)),-- therefor

In Column 11, Line 26, delete "Old." and insert --Old-- therefor

In Column 11, Line 39, delete "(MEMO)," and insert --(MIMO),-- therefor

Signed and Sealed this
Twenty-first Day of April, 2020

Andrei Iancu
*Director of the United States Patent and Trademark Office*

CERTIFICATE OF CORRECTION (continued)
U.S. Pat. No. 10,223,588 B2

In Column 13, Line 43, delete "matter such" and insert --matter-such-- therefor

In Column 15, Lines 53-54, delete ""at, least, one"" and insert --"at least one"-- therefor In Column 16, Line 16, delete "Detailed." and insert --Detailed-- therefor In the Claims In Column 17, Line 29, in Claim 13, after "claim 12", insert --,--

In Column 18, Lines 50-52, in Claim 32, delete "32. The set of machine readable media of claim 23, wherein the image includes at least one of luminance information or depth information." and insert --32. The set of machine readable media of claim 10, wherein the sensor is a camera sensitive to at least one of infrared, visible, or ultraviolet light to produce the luminance information, and wherein the sensor is at least one of a depth camera, solid state LIDAR, or mechanical LIDAR to produce the depth information.-- therefor In Column 18, Line 53, in Claim 33, delete "claim 32," and insert --claim 11,-- therefor